Patented Jan. 6, 1925.

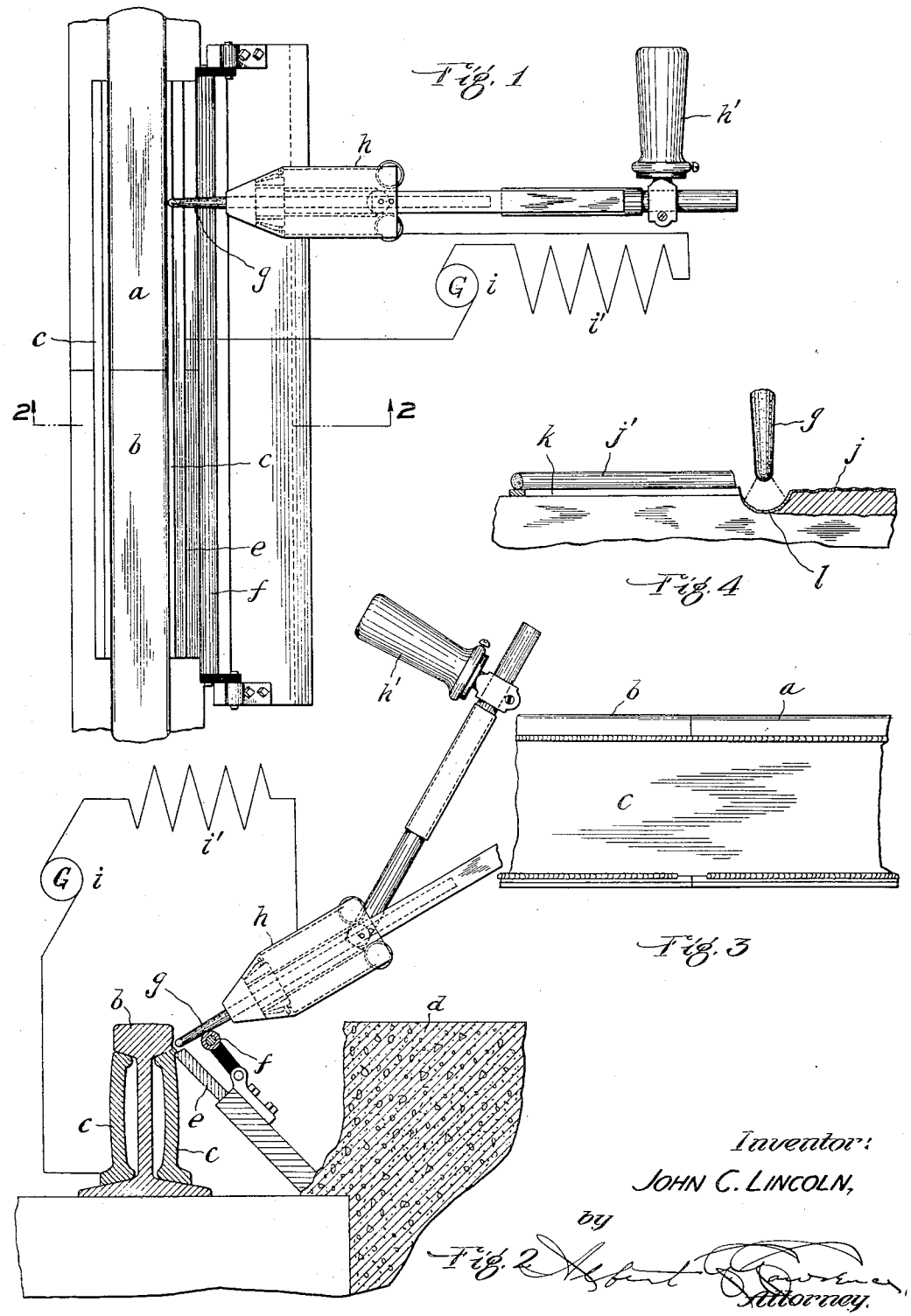

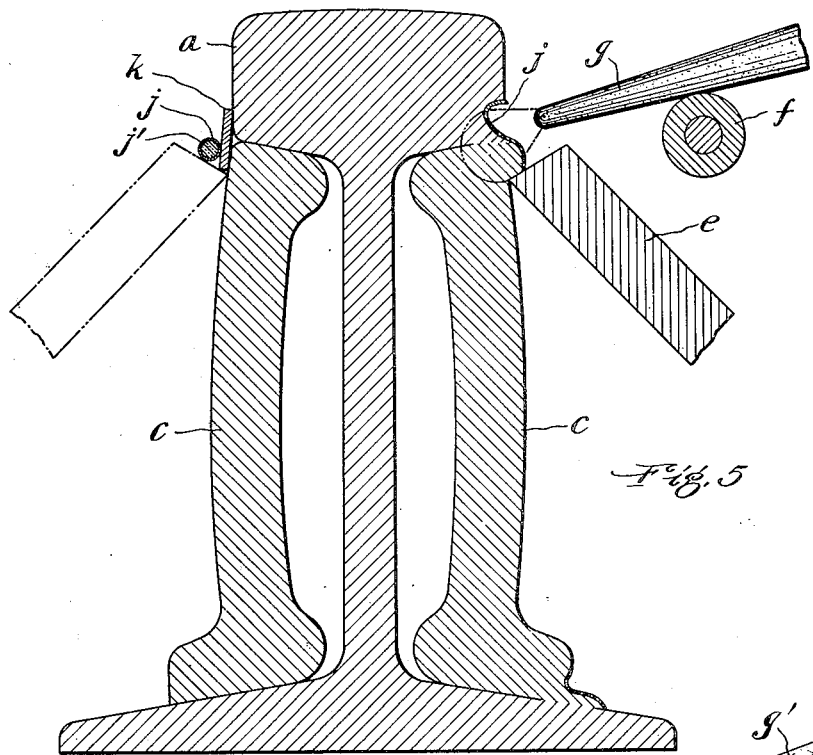
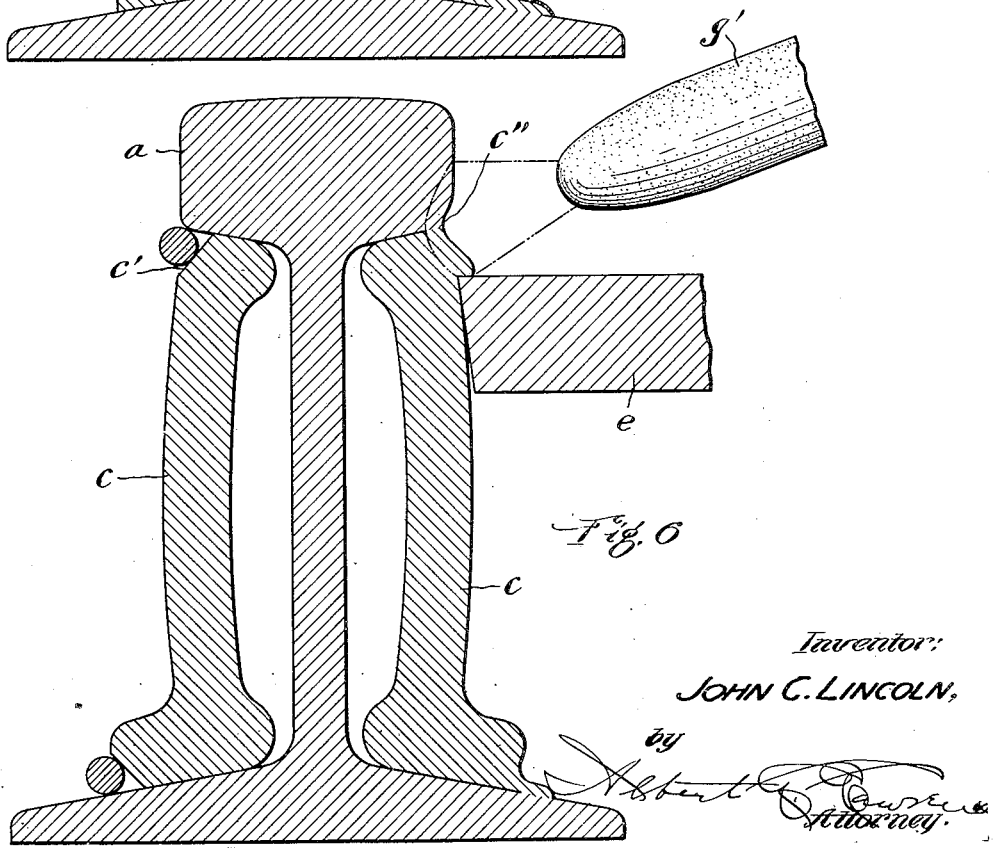

UNITED STATES PATENT OFFICE.

JOHN C. LINCOLN, OF EAST CLEVELAND, OHIO, ASSIGNOR TO THE CITIZENS SAVINGS AND TRUST COMPANY, OF CLEVELAND, OHIO, A CORPORATION OF OHIO.

METHOD OF AND MEANS FOR ELECTRIC-ARC WELDING.

Application filed January 26, 1920. Serial No. 353,935.

*To all whom it may concern:*

Be it known that I, JOHN C. LINCOLN, a citizen of the United States of America, residing at East Cleveland, in the county of Cuyahoga and State of Ohio, have invented certain new and useful Improvements in Methods of and Means for Electric-Arc Welding, of which the following is a specification.

My invention relates to improvements in method of and means for electric arc welding, and has for its object the production of deeply penetrating, ductile welds or seams. My invention more particularly is adapted for and will be described in connection with the art of welding or uniting railway rails, wherein certain difficult conditions must be satisfactorily met. Somewhat analogous conditions, however, are encountered in the welding of the steel plates of vessels, the members of bridges, buildings and the like, hence this invention is not limited to the particular application or use herein recited, except as shall expressly appear from the appended claims.

In practicing my invention, the welding arc is produced by the negative carbon electrode, instead of by a metallic electrode. This hitherto has presented the difficulty of effecting relatively shallow penetration and in consequence, welded seams of small cross section and brittle character. It is well known that the carbon arc is "wild" and not capable of being accurately and readily controlled. Moreover, in most cases it has previously been found that the welded material is brittle and upon being subjected to strain, as by the contraction or shrinkage of the metal, fine cracks will be formed which may extend into the body or bodies of the welded members and thereby contribute to breakage under conditions of tensile strain.

Previously it has been the common practice to bevel or groove the edges or faces of the members which are thus to be electrically welded, but this procedure at best, is expensive, while it is not readily adapted to all requirements and working conditions.

Accordingly, I have devised a method which practically eliminates the disadvantages above alluded to with respect to electric arc welding. My improved method primarily depends upon the use of a short and readily controllable electric arc, whereby deep penetration of the weld is insured. This arc preferably is sprung from a short section of carbon electrode and one of relatively small diameter, so that the combustion of the electrode tends constantly to maintain a relatively sharp point from which the arc is progressively directed along the welded seam.

Preferably the welding operation is conducted beneath a slag covering of suitable material, such as sodium carbonate, in order to exclude the air from the highly heated molten metal and thereby prevent oxidation of the metal with attendant brittle structure in the resulting seam.

The features of my invention may be more readily explained and understood by making reference to the accompanying drawings wherein:—

Fig. 1 is a plan view, somewhat diagrammatic in character, illustrating two rail ends, with the associated welding apparatus, in the course of being welded to each other through their embracing fish plates.

Fig. 2 is a transverse section through the foregoing figure on line 2—2, Fig. 1.

Fig. 3 is a side elevation of a fragment of the welded rail end. Fig. 4 is a section of the weld.

Fig. 5 is an enlarged transverse sectional view through a rail end and fish plates, illustrating the method of obtaining deep penetration for the weld, and Fig. 6 is a similar view whereby to contrast the practice of beveling and of welding with a relatively long, broad arc as known to the prior art.

Throughout the several figures of the drawings I have employed the same character of reference to indicate similar parts.

The improved arc welding method about to be exemplified comprises essentially the welding of two or more members by means of the negative carbon electrode under conditions of extreme current density and low voltage at the welding arc. It involves the formation of a relatively deep crater progressively in the welded members with a correspondingly deeply penetrating seam of molten metal, which preferably is augmented by a strip of additional metal melted into the bodies of the welded members under a suitable flux, such as sodium carbonate.

In the drawings I have illustrated the application of said method to the welding of rail ends between terminally embracing fish plates, as an important commercial adaptation thereof, although the method relates generally to improvements in arc welding, as defined in the appended claims.

The figures of the drawings are somewhat diagrammatic in character, as in Figs. 1 and 2, wherein the ends of rails $a$ and $b$ are shown to be terminally embraced by the fish plates $c$. In Fig. 2 the adjacent pavement $d$ has been excavated and a massive copper bar $e$ is disposed adjacent to the lower edge of the seam which is in course of being fabricated along the upper edge of the fish plate. An insulated rest or support $f$ preferably is employed for the carbon electrode $g$ which is adjustably held in a suitable copper holder $h$ provided with the handle $h'$ adapted to be turned to a convenient angle for use. The source of power $i$ and ballast resistance $i'$ also are indicated in the first two figures of the drawings.

I have stated that the carbon should be of relatively small diameter and that the portion connected in circuit should be of short length. To illustrate, the carbon $g$ desirably in some five-sixteenths inches in diameter and its projection beyond the copper support $h$ is approximately one to two inches. The working current may be assumed as 400 amperes, under which conditions the carbon electrode becomes so highly heated as to burn in the air, with the result that when fed forward manually in short sections, a tapering point is produced from which the negative arc springs, approximating three-sixteenths inches in diameter under normal working conditions at the tip of the carbon.

A comparatively short arc is used for the reason that with the relatively sharp point produced at the tip of the electrode, the operator is able very readily to control the action of the arc. The normal section of the arc stream approximates that of a cone, which probably is due to the fact that a reduction of resistance is thereby effected and this tendency is very difficult to overcome. However, with the use of a short arc the operator is able progressively to advance it along the line of the proposed seam and the material is propelled from the front to the rear of the crater in molten condition, while the penetration is sufficient to secure a deeply welded homologous seam, as indicated in Fig. 4. In Figs. 5 and 6 I have indicated by way of comparison, the resulting welds produced by the method herein disclosed, in contrast with the best known method of the prior art. Thus, in Fig. 6 the fish plates are shown to be grooved at $c'$ upon the left in order to assist in securing penetration, a rod of steel or alloy being disposed in the groove, while the ordinary carbon electrode $g'$, approximately seven-eighths inches in diameter, is indicated in the course of producing the weld $c''$ at the upper right hand portion of said figure. It is obvious that the area to which the arc is applied in Fig. 6 is considerably greater than is the area under the intensive action of the short arc from the sharp pointed carbon electrode $g$ previously described and shown in Fig. 5. Thus, the diameter of the conical arc at its base or position of contact with the rail head and fish plate in Fig. 6 approximates seven-eighths of an inch, while the corresponding diameter of the short arc in Fig. 5 approximates only seven-sixteenths of an inch in diameter. Since the areas are proportionate to the squares of their respective diameters, the area of the position of contact of the arc in Fig. 6 approximates four times that of the arc of Fig 5. Assuming the same current consumption in both cases, the heat developed per unit of area, accordingly, will be four times as great with short arc of Fig. 5 and its penetration will be very materially increased over that of the longer arc, as I have endeavored to indicate. Moreover, the control of this short arc is much more readily and effectively secured, for the reason that the arc from a blunted carbon notably is "wild" and more or less unmanageable at times.

When welding along a vertical surface, the molten metal preferably is chilled by means of a contacting bar $e$ of copper, while a suitable flux, such as sodium carbonate is applied to the metal of the proposed seam in any suitable manner. In order to position the flux, preferably it is enclosed in a thin, metallic tube $j$ which contains the charge of flux $j'$ in solid form until melted under the arc. Moreover, additional metal to fabricate the seam ordinarily is applied, as by a flat wire $k$ of steel or suitable alloy, disposed in position to be melted into the welded seam by the arc as it progresses along the edge of the fish plate.

While any suitable flux may be employed, I prefer sodium carbonate for the reason that it possesses the property of high capillary action so that in its molten condition, it immediately spreads over the surface of the melted steel, much as oil will spread over water, even when the seam produced is substantially vertical. Thus, the air is practically excluded from the molten steel, which practically eliminates oxidation and makes the welded seam one of high ductility.

From the foregoing statements it will be appreciated that this invention is largely contributed to by the fact that a short length of carbon electrode having a relatively small diameter, will become highly heated and burn in the atmosphere. Consequently, when such electrode is fed forward from its conductive holder in short lengths, the extremity will be burned to a tapering point from which the arc may be readily directed.

In Fig. 4 I have shown a longitudinal section of the weld in process of fabrication; the travel of the tapering carbon being from right to left. Preferably, the arc is maintained as short as it may be drawn with a well defined crater 1, of such depth as to produce the desired penetration of the welded seam. As the electrode is advanced toward the left the molten metal will visibly be impelled from the left to the right side of said crater and the operator will so direct the arc as to keep the bottom of the crater as free from molten metal as possible.

Having now described the preferred method of and means for practicing my invention, I claim as new and desire to secure by Letters Patent, together with such modifications as may be made by mere skill, the following:—

1. The method of electric arc welding which consists in maintaining conditions of extreme current density and low voltage at the welding arc such as will cause all of the electrode in circuit to remain at combustible temperature, substantially as set forth.

2. The method of electric arc welding which consists in establishing at the arc of a carbon electrode conditions of extreme current density with a voltage no greater than thirty-five volts such as will cause all of the carbon electrode in circuit to remain at combustible temperature, while maintaining the molten metal beneath a slag covering having a high surface tension, substantially as set forth.

3. The method of electric arc welding which consists in establishing conditions insuring the maintenance of as short an arc as may be drawn with a well defined crater in the article to be welded, and progressively advancing the short penetrating arc, substantially as set forth.

4. The method of electric arc welding with a carbon electrode which consists in establishing conditions for maintaining as short an arc as may be projected with a well defined crater in the article to be welded and with a minimum length of electrode in circuit sufficient only to permit the performance of the welding operation, substantially as set forth.

5. The method of uniting railway rails, comprising the welding of the edges of embracing fish plates to the ends of said rails by an electric arc maintained as short as it may be drawn under working conditions with a well defined crater deeply penetrating both the body portion of the rail and of the fish plate, while advancing the arc to produce a longitudinal seam under a molten slag having a high surface tension, substantially as set forth.

6. The method of uniting railway rails, comprising the welding of the edges of terminally embracing fish plates to the ends of said rails by a carbon electrode of such restricted diameter and length as will maintain a long, tapering point and with a short electric arc, progressively advancing said arc to produce a deeply penetrating weld and chilling the lower portion of the weld in order to retain the molten metal substantially in position, substantially as set forth.

7. The method of uniting railway rails, comprising the welding of the edges of terminally embracing fish plates to the ends of said rails by a carbon electrode of such restricted diameter and length as will maintain a long, tapering point and with a short electric arc, progressively advancing said arc to produce a deeply penetrating weld and supporting adjacent to said weld a slag-forming member that is melted to cover the molten metal as the welding operation progresses, substantially as set forth.

8. The method of uniting railway rails, comprising the welding of the upper and lower edges of terminally embracing fish plates to the ends of said rails by a negative carbon electrode of such restricted diameter and fed into circuit in such short length as will maintain thereon a long, tapering point and with a short electric arc, progressively advancing said arc along the edges to produce a crater effecting a deeply penetrating weld between said members, providing an inert covering for the molten metal and chilling its lower portion, substantially as set forth.

9. The herein described method of electric arc welding with the negative carbon electrode, which consists in conducting the welding operation under such conditions as will insure the continual burning of the electrode to a long, tapering point and directing the short welding arc from the tip of said electrode to produce a travelling, deeply penetrating crater, substantially as set forth.

10. The herein described method of electric arc welding with the negative carbon electrode, which consists in providing a carbon electrode of such small cross section as to be maintained at combustible temperature, feeding it into circuit in short sections as the carbon is consumed to burn the electrode to a long, tapering point, and progressively advancing a short electric arc drawn to the tip of said electrode along the seam to be welded, substantially as set forth.

11. The herein described method of electric arc welding, which consists in providing a carbon electrode of such restricted diameter and length as will maintain the portion in circuit at a combustible temperature to burn the electrode to a long, tapering point, slowly feeding the electrode into circuit as the same is consumed and shortened, striking from the tip a short arc progressively advanced along the welded seam as deep penetration is obtained, and meantime maintaining the molten metal beneath a protective slag covering, substantially as set forth.

12. The art of electric arc welding which consists in maintaining a welding arc at the end of a short length of highly heated burning carbon electrode, substantially as set forth.

In testimony whereof I do now affix my signature.

JOHN C. LINCOLN.